United States Patent
Chung et al.

(10) Patent No.: US 8,644,210 B2
(45) Date of Patent: Feb. 4, 2014

(54) METHOD AND APPARATUS OF TRANSMITTING AND RECEIVING BACKHAUL DOWNLINK CONTROL INFORMATION IN A WIRELESS COMMUNICATION SYSTEM

(75) Inventors: Jae Hoon Chung, Anyang-si (KR); Kyu Jin Park, Anyang-si (KR); Sung Ho Moon, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/321,260

(22) PCT Filed: May 19, 2010

(86) PCT No.: PCT/KR2010/003153
§ 371 (c)(1),
(2), (4) Date: Nov. 18, 2011

(87) PCT Pub. No.: WO2010/134749
PCT Pub. Date: Nov. 25, 2010

(65) Prior Publication Data
US 2012/0069790 A1    Mar. 22, 2012

Related U.S. Application Data

(60) Provisional application No. 61/179,714, filed on May 19, 2009, provisional application No. 61/181,296, filed on May 27, 2009, provisional application No. 61/254,605, filed on Oct. 23, 2009.

(51) Int. Cl.
*H04W 4/00* (2009.01)
*H04J 3/00* (2006.01)

(52) U.S. Cl.
USPC ............ 370/315; 370/329; 370/330; 370/336

(58) Field of Classification Search
USPC ......... 370/254, 280, 281, 315, 322, 329, 330, 370/336, 338; 455/7, 424
See application file for complete search history.

(56) References Cited

U.S. PATENT DOCUMENTS

| 8,259,637 B2* | 9/2012 | Bertrand et al. ............... 370/315 |
| 2008/0076406 A1* | 3/2008 | Chen et al. ..................... 455/424 |
| 2008/0165719 A1 | 7/2008 | Visotsky |
| 2009/0029645 A1* | 1/2009 | Leroudier ......................... 455/7 |
| 2010/0254301 A1* | 10/2010 | Blankenship et al. ........ 370/315 |

FOREIGN PATENT DOCUMENTS

KR    2007-0078449    8/2007

* cited by examiner

*Primary Examiner* — Afsar M Qureshi
(74) *Attorney, Agent, or Firm* — McKenna Long & Aldridge LLP

(57) ABSTRACT

The present invention relates to a method and an apparatus of transmitting and receiving backhaul downlink control information in a wireless communication system. In the method for transmitting backhaul downlink control information from a base station in a wireless communication system according to one aspect of the present invention, the base station transmits resource allocation information to at least one terminal and at least one relay node via a relay-physical downlink control channel (hereinafter referred to as "R-PDCCH"); transmits backhaul system information to the at least one relay node and the at least one terminal via a relay physical downlink shared channel (hereinafter referred to as "R-PDSCH") which is determined according to the resource allocation information; and changes a backhaul downlink resource block according to the backhaul system information.

14 Claims, 8 Drawing Sheets

METHOD AND APPARATUS OF TRANSMITTING AND RECEIVING BACKHAUL DOWNLINK CONTROL INFORMATION IN A WIRELESS COMMUNICATION SYSTEM

This application is a 35 U.S.C. §371 National Stage Entry of International Application PCT/KR2010/003153, filed on May 19, 2010, which claims the benefit of priority under 35 U.S.C. §119(e) to U.S. Provisional Application Nos: 61/179,714, filed May 19, 2009, 61/181,296, filed May 27, 2009 and 61/254,605, filed Oct. 23, 2009, which are hereby incorporated by reference in their entirety for all purposes as if fully set forth herein.

FIELD OF THE INVENTION

The present invention relates to a wireless communication system, and more particularly to a method and apparatus for transmitting and receiving backhaul downlink control information in a wireless communication system.

BACKGROUND ART

First, a frame structure of a wireless communication system will hereinafter be described with reference to FIG. 1. FIG. 1 is a diagram illustrating a frame structure of Long Term Evolution (LTE) system. Referring to FIG. 1, one frame includes 10 subframes, and one subframe includes two slots. A time required for transmitting one subframe is defined as a Transmission Time Interval (TTI). For example, one subframe may have a length of 1 ms, and one slot may have a length of 0.5 ms.

One slot may include a plurality of Orthogonal Frequency Division Multiplexing (OFDM) symbols. The OFDM symbol may be called an SC-FDMA symbol or a symbol duration.

One slot may include 7 or 6 OFDM symbols according to a cyclic prefix (CP) length. The LTE system includes a normal CP and an extended CP. In case of the normal CP, one slot may include 7 OFDM symbols. In case of the extended CP, one slot may include 6 OFDM symbols.

In order to transmit resource allocation information of each subframe at intervals of a subframe, an eNode B (eNB) transmits a physical downlink control channel (PDCCH) to $0^{th}$ to $2^{nd}$ OFDM symbols (in case that a starting one from among the OFDM symbols of a subsframe is the $0^{th}$ OFDM symbol). In this case, according to the amount of PDCCH, PDCCH can be transmitted to the $0^{th}$ OFDM symbol, the $0^{th}$ to $1^{st}$ OFDM symbols, the or $0^{th}$ to $2^{nd}$ OFDM symbols.

FIG. 2 shows a resource structure of one DL slot. Referring to FIG. 2, one slot includes 7 OFDM symbols. A resource element (RE) is a resource region including one OFDM symbol and one subcarrier. A resource block (RB) is a resource region including a plurality of OFDM symbols and a plurality of subcarriers. For example, the RB may include 7 OFDM symbols in a time domain and include 12 subcarriers in a frequency domain. The number of RBs contained in one slot may be determined according to a DL bandwidth.

In a general wireless communication system, direct signal communication is achieved between a fixed eNB and a UE through a link, such that a high reliability wireless communication link can be easily configured between the eNB and the UE. However, since the wireless communication system may have a fixed eNB, it has low flexibility in wireless network configuration. In addition, the conventional wireless communication system has difficulty in providing an efficient communication service to a wireless environment that experiences either poor traffic distribution or serious variation in numbers of call-connection requests. In order to obviate the above-mentioned disadvantages, a data transmission scheme of a fixed relay node, a data transmission scheme of a mobile relay node, or a relaying-node data transmission scheme of general UEs can be applied to a wireless communication system.

FIG. 3 is a diagram illustrating a wireless communication network using a relay node (RN).

The relaying wireless communication system may reconfigure a network by rapidly responding to communication environment variation, and may more efficiently operate the entire wireless network. For example, the relaying wireless communication system increases a cell service region and system capacity. That is, if a channel condition between the eNB and the UE is poor, a relay node (RN) is installed between the eNB and the UE and a relaying path is configured through the relay node (RN), such that a radio frequency (RF) channel having superior channel conditions can be provided to the UE.

In addition, a relay node (RN) is introduced to a cell edge region having a poor channel condition such that it can provide a higher-speed data channel and can extend a cell service region.

As described above, the relay node (RN) has been widely used to solve the propagation shade region in a mobile communication system. Compared to the conventional art that is restricted to functions of a repeater capable of amplifying/transmitting a signal, the latest technology is being developed to cover more intelligent techniques.

Furthermore, the relay node (RN) technology can reduce costs associated with increasing the number of eNBs and maintenance costs of a backhaul network in next generation mobile communication systems, and is requisite for extending the service coverage simultaneously while increasing the data processing rate. With the increasing development of relay node (RN) technology, the necessity for the relay node (RN) used in the conventional wireless communication system to be supported by the new wireless communication system is also increasing.

In FIG. 3, a link between the eNB and the RN is defined as a backhaul link. If transmission of data using DL frequency band or DL subframe resources is achieved in a backhaul link, this backhaul link is referred to as backhaul downlink. If transmission of data using UL frequency band or UL subframe resources is achieved in a backhaul link, this backhaul link is referred to as backhaul uplink. In addition, the connection link between the RN and the UE is defined as an access link. If data transmission is achieved in an access link using a DL frequency band or DL subframe resources, this access link is referred to as access downlink. If data transmission is not achieved in an access link using a UL frequency band or UL subframe resources, this access link is referred to as access uplink.

A plurality of relay nodes (RNs) may exist in one eNB, and the eNB may have to transmit common control information of the RNs.

DETAILED DESCRIPTION OF THE INVENTION

Technical Problem

As described above, the eNB may have to transmit common control information of a plurality of relay nodes (RNs).

An object of the present invention is to provide a method for enabling an eNB to transmit RN common control information through backhaul downlink.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting backhaul downlink control information by a base station of a wireless communication system including transmitting resource assignment information to one or more user equipments (UEs) and one or more relay nodes (RNs) over a relay-physical downlink control channel (R-PDCCH), transmitting backhaul system information to the one or more RNs and the one or more UEs over a relay-physical downlink shared channel (R-PDSCH) determined according to the resource assignment information, and changing a backhaul downlink resource region according to the backhaul system information.

The backhaul system information may be resource assignment information of the backhaul downlink.

The R-PDCCH may be assigned to OFDM symbols located after a guard time for transmission/reception (Tx/Rx) mode switching of a backhaul downlink.

In another aspect of the present invention, a method for receiving backhaul downlink control information by a relay node (RN) of a wireless communication system includes receiving resource assignment information from a base station over a relay-physical downlink control channel (R-PDCCH), receiving backhaul system information from the base station over a relay-physical downlink shared channel (R-PDSCH) determined according to the resource assignment information; and receiving a backhaul downlink subframe according to the backhaul system information.

In another aspect of the present invention, a method for receiving backhaul downlink control information by a user equipment (UE) of a wireless communication system includes receiving resource assignment information from a base station over a relay-physical downlink control channel (R-PDCCH), receiving backhaul system information from the base station over a relay-physical downlink shared channel (R-PDSCH) determined according to the resource assignment information, and receiving a downlink subframe according to the backhaul system information.

In another aspect of the present invention, a base station includes a transmission (Tx) module for transmitting resource assignment information to one or more user equipments (UEs) and one or more relay nodes (RNs) over a relay-physical downlink control channel (R-PDCCH), and transmitting backhaul system information to the one or more RNs and the one or more UEs over a relay-physical downlink shared channel (R-PDSCH) determined according to the resource assignment information, and a processor for changing a backhaul downlink resource region according to the backhaul system information.

In another aspect of the present invention, a relay node (RN) includes a reception (Rx) module for receiving resource assignment information from a base station over a relay-physical downlink control channel (R-PDCCH), receiving backhaul system information from the base station over a relay-physical downlink shared channel (R-PDSCH) determined according to the resource assignment information, and receiving a backhaul downlink subframe according to the backhaul system information.

In another aspect of the present invention, a user equipment (UE) includes a reception (Rx) module for receiving resource assignment information from a base station over a relay-physical downlink control channel (R-PDCCH), receiving backhaul system information from the base station over a relay-physical downlink shared channel (R-PDSCH) determined according to the resource assignment information, and receiving a downlink subframe according to the backhaul system information; and a processor for decoding the subframe.

In another aspect of the present invention, a method for transmitting backhaul downlink control information by a base station of a wireless communication system includes transmitting first resource assignment information to one or more user equipments (UEs) over a physical downlink control channel (PDCCH), transmitting backhaul system information to the one or more UEs over a physical downlink shared channel (PDSCH) determined according to the first resource assignment information, transmitting second resource assignment information to one or more relay nodes (RNs) over a relay-physical downlink control channel (R-PDCCH), transmitting the backhaul system information to the one or more RNs over a relay-physical downlink shared channel (R-PDSCH) determined according to the second resource assignment information, and changing a backhaul downlink resource region according to the backhaul system information.

In another aspect of the present invention, a method for transmitting backhaul downlink control information by a base station of a wireless communication system includes transmitting resource assignment information to one or more user equipments (UEs) over a physical downlink control channel (PDCCH), transmitting the resource assignment information to one or more relay nodes (RNs) over a relay-physical downlink control channel (R-PDCCH), transmitting backhaul system information to the one or more RNs and the one or more UEs over a relay-physical downlink shared channel (R-PDSCH) determined according to the resource assignment information, and changing a backhaul downlink resource region according to the backhaul system information.

In another aspect of the present invention, a method for transmitting backhaul control information by a base station of a wireless communication system includes transmitting uplink resource assignment information to a relay node (RN) over an uplink grant relay-physical downlink control channel (R-PDCCH) multiplexed by a frequency division multiplexing (FDM) scheme; and receiving data from the relay node (RN) through uplink resources assigned according to the resource assignment information.

Effects of the Invention

As apparent from the above description, exemplary embodiments of the present invention have the following effects. The eNB can efficiently transmit RN common control information to an RN and a UE.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE-A system, but the present invention is not limited thereto and the remaining parts of the present invention other than unique characteristics of the 3GPP LTE-A system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS), a relay node (RN) and the like. Also, the eNode B (eNB) may refer to an arbitrary node of a network end which communicates with the above terminal, and may include a Node B, eNode B, a base station (BS), a relay node (RN) and the like.

First, a method for multiplexing a relay transmission region and a relay-physical downlink control channel (R-PDCCH) will hereinafter be described with reference to the attached drawings.

Figure 4:
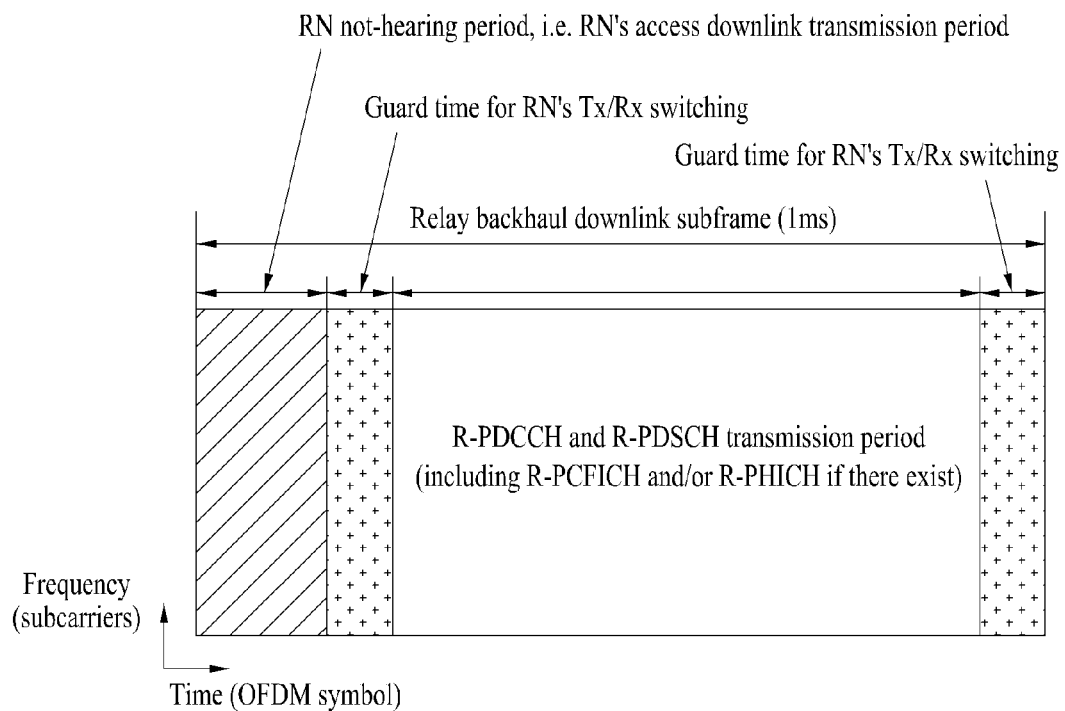
FIG. 4 illustrates an example of backhaul DL subframe.

The relay transmission region will hereinafter be described with reference to FIG. 4. FIG. 4 illustrates an example of a backhaul DL subframe.

In order to prevent a relay node (RN) from simultaneously performing transmission and reception operations on a DL or UL frequency carrier, a backhaul link and an access link are TDM (Time Division Multiplexing)-processed.

As can be seen from FIG. 4, front one or two OFDM symbols of a backhaul DL subframe may be set to a not-hearing period in which a relay node (RN) is unable to receive a backhaul DL. The RN may transmit an access downlink without receiving a backhaul downlink at a specific time corresponding to the front one or two OFDM symbols of the backhaul DL subframe.

In more detail, the RN supports measurement capability on the assumption of transmission of contiguous cell-specific reference signals (CRSs) of a subframe level of an FDD-mode Release-8 LTE UE contained in an RN region, such that it can support backward compatibility. The RN may transmit a downlink a fake-Multicast/Broadcast Single-Frequency Network (fake-MBSFN) subframe to a Release-8/9 LTE UE and a Release-10 LTE-advanced UE of the RN region in a subframe used for backhaul downlink reception. The fake-MBSFN subframe may be used as a subframe in which the front one or two OFDM symbols of a subframe are transmitted and the remaining OFDM symbols are not transmitted.

Therefore, the front one or two OFDM symbols of a backhaul DL subframe are used as 'not-hearing' symbols from the viewpoint of a relay node (RN) that does not simultaneously transmit and receive data through downlink. Such the not-hearing symbols are not decoded by the RN. On the other hand, the eNB may transmit a PDCCH for each UE directly connected to the eNB at a specific time corresponding to the front one or two OFDM symbols of a backhaul DL subframe.

As shown in FIG. 4, a symbol duration subsequent to the not-hearing period and/or the last symbol duration of a subframe may be assigned to a guard time or transition gap for RN Tx/Rx switching or RN Rx/Tx switching.

Although the guard time or transition gap may be basically defined as one OFDM symbol duration, the guard time or transition gap may be shorter than one OFDM symbol duration (for example, time samples corresponding to a half length of one OFDM symbol duration) or may be longer than one OFDM symbol duration (for example, a length corresponding to several OFDM symbol durations or a length corresponding to the sum of the length of N OFDM symbols and the half length of one OFDM symbol duration).

The number of OFDM symbols corresponding to the not-hearing period, the guard time or the transition gap may be identical to or higher than the number of PDCCH transmission symbols that are transmitted by the eNB through downlink (i.e., Case 1) or may be less than the number of PDCCH transmission symbols (i.e., Case 2). In Case 2, an OFDM symbol duration for PDCCH transmission, located after the not-hearing period, the guard time or the transition gap, is a meaningless symbol duration in which physical channel reception is unavailable, such that the above-mentioned OFDM symbol duration need not be separately decoded.

As can be seen from FIG. 4, the remaining regions other than the not-hearing duration and the guard time or transition gap (See Case 1), or the remaining regions other than the eNB PDCCH transmission symbol duration (See Case 2) may be used as a relay transmission region. The eNB may transmit a unique relay physical downlink control channel (R-PDCCH) and a unique relay physical downlink shared channel (R-PDSCH) to the RN through the relay transmission region.

The present embodiment provides four R-PDCCH multiplexing methods.

In a first method, physical transmission resources used for R-PDCCH transmission may be established for each relay node (RN) according to the FDM scheme. Granularity of physical transmission resources may be established on a PRB (Physical Resource Block) or RB (Resource Block) basis. In contrast, the PRB may also have granularity different in size from 12 subcarrier RBs. A logical transmission resource may be established on a virtual RB (VRB) basis. In this case, the logical transmission resource may be mapped to a PRB according to the VRB-to-PRB mapping rule. The VRB-to-PRB mapping rule is classified into the localized mapping rule and the distributed mapping rule.

In the localized mapping scheme, VRB-based transmission resources may be contiguously mapped to PRBs. In the distributed mapping scheme, VRB-based transmission resources may be distributed in units of a resource element (RE) group such that the distributed result is non-contiguously mapped in a frequency domain.

In a second method, a relay transmission region may be set to the entire system band or less. A R-PDCCH transmission region and A R-PDSCH transmission region may be TDM-processed in the relay transmission region on a backhaul DL subframe. R-PDCCH for each RN may be FDM- or TDM/FDM-processed in the R-PDCCH transmission region.

In this case, for example, the scheme for mapping PDCCH control information of the Release-9 LTE to a CCE (i.e., PDCCH control information-to-CCE mapping) may be identical to or similar to a CCE-to-RE mapping scheme. In addition, not only R-PDCCH but also PDSCHs of LTE-A UEs directly connected to the eNB may also be multiplexed in the relay transmission region.

In addition, the number of R-PDCCH transmission symbols for each RN and/or the transmission symbol positions (i.e., the position of a start symbol and the position of an end symbol) may be uniquely established in the relay transmission region.

In a third method, a relay transmission region may be considered a frequency band in which R-PDCCH is multiplexed. That is, R-PDCCH for an arbitrary RN on a frequency band acting as the relay transmission region may be an arbitrary number of transmission symbols (e.g., one transmission symbol) in the corresponding relay transmission region, and may be FDM- or TDM/FDM-processed with a different R-PDCCH in the TDM-based R-PDCCH transmission region.

In this case, the scheme for mapping PDCCH control information of the Release-9 LTE to a CCE may be identical to or similar to the scheme for mapping a CCE to an RE.

In addition, in order to allow the eNB to assign R-PDSCH resources through a R-PDCCH, the eNB may assign the R-PDSCH resources not only to the relay transmission region but also the entire system band.

In addition, not only R-PDSCH but also PDSCHs of LTE-A UEs directly connected to the eNB may also be multiplexed in the relay transmission region.

In addition, the number of R-PDCCH transmission symbols for each RN and/or the transmission symbol positions (i.e., the position of a start symbol and the position of an end symbol) may be uniquely established in the relay transmission region.

In a fourth method, backhaul DL transmission resources for each RN are FDM-processed, and a relay transmission region is divided into a primary resource region and a secondary resource region. The primary resource region may be configured in a higher layer through cell-specific or relay-node-specific radio resource control (RRC) signaling. R-PDCCH and R-PDSCH are multiplexed in the primary resource region. R-PDSCH may transmit some PDSCH data symbols to the primary resource region through rate matching.

The secondary resource region may be dynamically established in units of one or more subframes through a resource assignment field of a R-PDCCH transmitted in the primary resource region. In this case, if a R-PDSCH to be used for scheduling assignment transmits some data symbols to the primary resource region, the resource assignment field of the R-PDCCH extends the range of resource assignment indication to the frequency transmission resource region of the primary resource region, such that it may indicate the presence or absence of multiplexing in the R-PDCCH transmission resource region related to R-PDSCH.

R-PDCCH and R-PDSCH multiplexing schemes may be defined by at least one of the above-mentioned four methods. In addition, a physical resource region for R-PDCCH transmission and a physical resource region for R-PDSCH transmission may be decided according to the R-PDCCH and R-PDSCH multiplexing schemes. Relay backhaul DL transmission resource region information related to such physical resource region decision may be semi-statically or permanently transmitted through cell-specific RRC signaling, or may be dynamically transmitted to a UE through cell-specific L1/L2 control signaling. In the former case, corresponding transmission resource region information may be transmitted through R-PDSCH, and associated resource assignment and transmission scheme indication may be signaled through cell-specific relay-node-common R-PDCCH and/or cell-specific PDCCH (in case of using a transmission method for LTE-A UEs) according to methods proposed by the present invention. In the latter case, the above-mentioned information may also be directly transmitted through arbitrary-cell-specific or relay-node-specific R-PDCCH and/or PDCCH (in case of using a transmission method for LTE-A UEs) according to methods proposed by the present invention.

In this case, relay backhaul DL transmission resource region information defined as cell-specific system information must be basically transmitted to RNs. However, from the viewpoint of an increase in resource efficiency, provided that Release-10 LTE-A UEs support capability through which physical resources can be assigned to each UE within the corresponding relay backhaul DL transmission resource region, the relay backhaul DL transmission resource region information must also be transmitted to the Rel-10 LTE-A UEs.

In accordance with the present embodiment, the term "backhaul resource assignment system information' may indicate resource assignment information of a backhaul link. In more detail, the backhaul resource assignment system information may include relay backhaul DL time-frequency transmission resource region information, information regarding numbers of R-PDCCH and R-PDSCH transmission OFDM symbols, information regarding positions of R-PDCCH and R-PDSCH transmission OFDM symbols, a frequency subcarrier for R-PDCCH transmission or a PRB-level frequency resource assignment information, backhaul subframe configuration information, etc.

In addition, a relay node (RN) having a separate physical cell ID is referred to as a Type-1 relay node. The Type-1 relay node transmits a paging channel and paging indication channel to an access downlink. The paging channel information serves as either information for idle-state UEs or discontinuous reception (DRX)-state UEs of the tracking area including a plurality of eNBs, or information of all UEs, such that paging information of RNs contained in the same tracking area may be transmitted as RN common information on a backhaul downlink.

In the present embodiment, the term "backhaul system information" may conceptually include backhaul resource assignment system information and paging associated information.

The backhaul system information may include relay backhaul downlink transmission resource region information, the number or position of OFDM symbols used for R-PDCCH transmission, a frequency subcarrier for FDM-based R-PDCCH transmission or PRB-level resource assignment information, backhaul subframe configuration information, relay backhaul uplink frequency data channel transmission resource region information, and relay backhaul uplink frequency control channel transmission resource region information (i.e., the positions of start and end symbols for R-PDCCH transmission, frequency domain information of a serious of relay R-PDCCH regions, candidate resource region information used for applying blind decoding to a R-PDCCH region). The backhaul system information may further include carrier assignment information when carrier aggregation on relay backhaul downlink and/or uplink is cell-specifically established, and system information signaled to a general Release-8 LTE UE or LTE-A UE. In addition, the backhaul system information may further include CoMP-related cell-specific system control information when CoMP (Coordinated Multi-Point) transmission/reception (Tx/Rx) technology is applied to relay backhaul DL and/or UL, paging information transmitted to the access DL, associated channel assignment information, a paging indication channel and/or paging information on a relay backhaul DL, etc.

Backhaul system information of a cell eNB may be configured as a combination of all or some parts of the above-mentioned system information.

In addition to the above-mentioned system information, RN specific RRC signaling information may be basically transmitted through R-PDSCH to which channel was assigned through R-PDCCH.

The present embodiment provides a variety of methods for transmitting backhaul system information not only to a relay node (RN) but also to an RN and LTE-A UEs.

As to a method for allowing the eNB to transmit backhaul system information to a plurality of RNs in which a backhaul link is configured, through cell-specific RRC signaling, the eNB may transmit a CRC-masked R-PDCCH to an RN common C-RNTI (Cell Radio Network Temporary ID) through the R-PDCCH transmission resource region of a backhaul DL subframe, and may transmit backhaul system information through R-PDSCH assigned through R-PDCCH. In this case, the C-RNTI serving as cell-specific IDs to identify a series of UEs or RNs may be identical to a cell-specific UE common RNTI conceptually identical to SI-RNIT of the Release-8 LTE system.

However, if there is a need for the eNB to transmit backhaul system information to RNs and LTE-A UEs, a method for transmitting backhaul system information in consideration of a difference between R-PDCCH and PDCCH resource assignment regions needs to proposed.

One embodiment provides a method for allowing an eNB to transmit backhaul system information to RNs and LTE-S UEs. Methods proposed by the present invention are different types of RN common control information, and may be applied to a method for transmitting Transmit Power Control (TPC) control information on a RN group basis or on an access-link UE group basis. Another embodiment provides a PDCCH or R-PDCCH transmission method in which a random access response message depending upon random access channel (RACH) preamble transmission is CRC-masked with one or more RNs using a specific RA-RNTI on the condition that random access capability is assigned to each RN.

A method for transmitting backhaul DL control information according to a first embodiment of the present invention will hereinafter be described with reference to FIG. 5.

The method for transmitting backhaul DL control information according to the first embodiment of the present invention can minimize complexity and costs from the viewpoint of LTE-A UE and RN reception.

Figure 5:
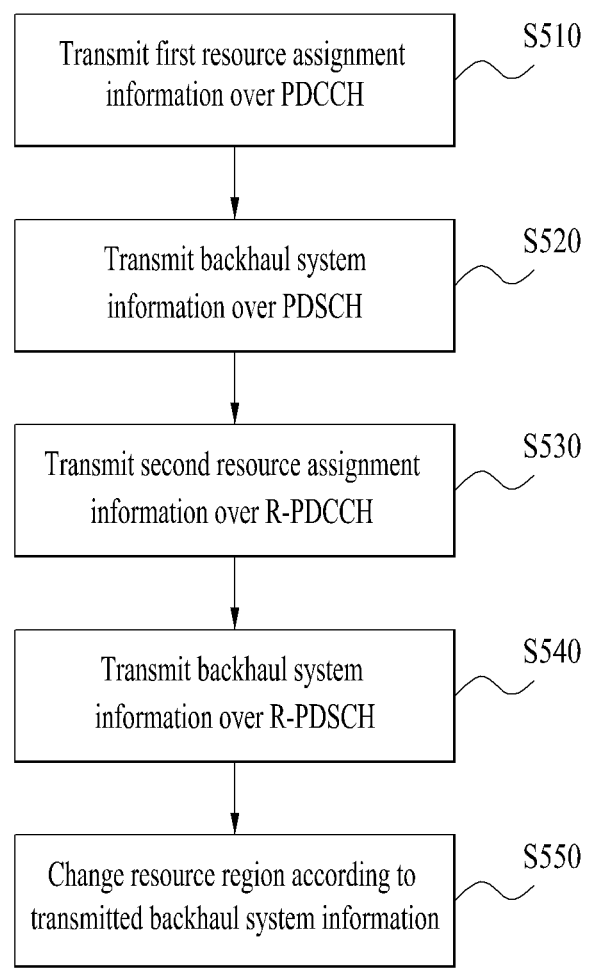
FIG. 5 is a flowchart illustrating a method for transmitting backhaul DL control information according to a first embodiment of the present invention.

Referring to FIG. 5, the eNB transmits first resource assignment information to one or more UEs over a PDCCH in step S510.

In this case, the PDCCH may be transmitted through a PDCCH region, defined as the first one, first two, first three, or first OFDM symbols of a DL subframe, according to the CCE concept of the legacy Release-8 LTE system and the basic concept of CCE and RE mapping.

In addition, backhaul system information is transmitted to the one or more UEs through RRC signaling over a PDSCH determined according to the first resource assignment information in step S520.

In addition, the eNB may transmit second resource assignment information to one or more RNs over a R-PDCCH in step S530. The eNB may transmit backhaul system information to the one or more RNs through RRC signaling over a R-PDSCH determined according to the second resource assignment information in step S540.

A resource region is changed according to the transmitted backhaul system information in step S550. If P is an integer of 1 or higher, after the eNB transmits backhaul system information through RRC signaling at a specific subframe, it may configure a resource region in response to backhaul system information transmitted from a time point corresponding to P subframes elapsed from the specific subframe. As a result, the eNB may receive a subframe according to the changed resource region configuration in the range from a backhaul DL subframe located just after the subframe having received the backhaul system information, or may receive a subframe depending upon the changed resource region configuration after the lapse of M subframes (where M≥1) located after the subframe having received backhaul system information.

Figure 1:
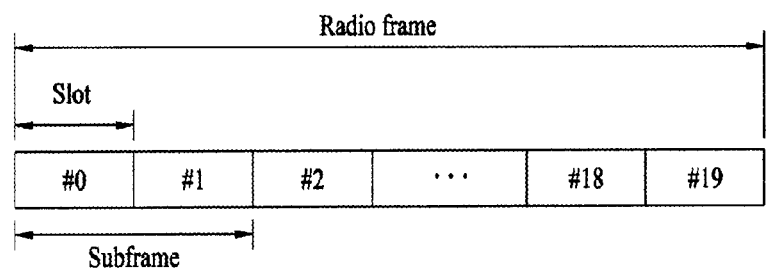
FIG. 1 is a diagram illustrating a frame structure of Long Term Evolution (LTE) system.
Figure 2:
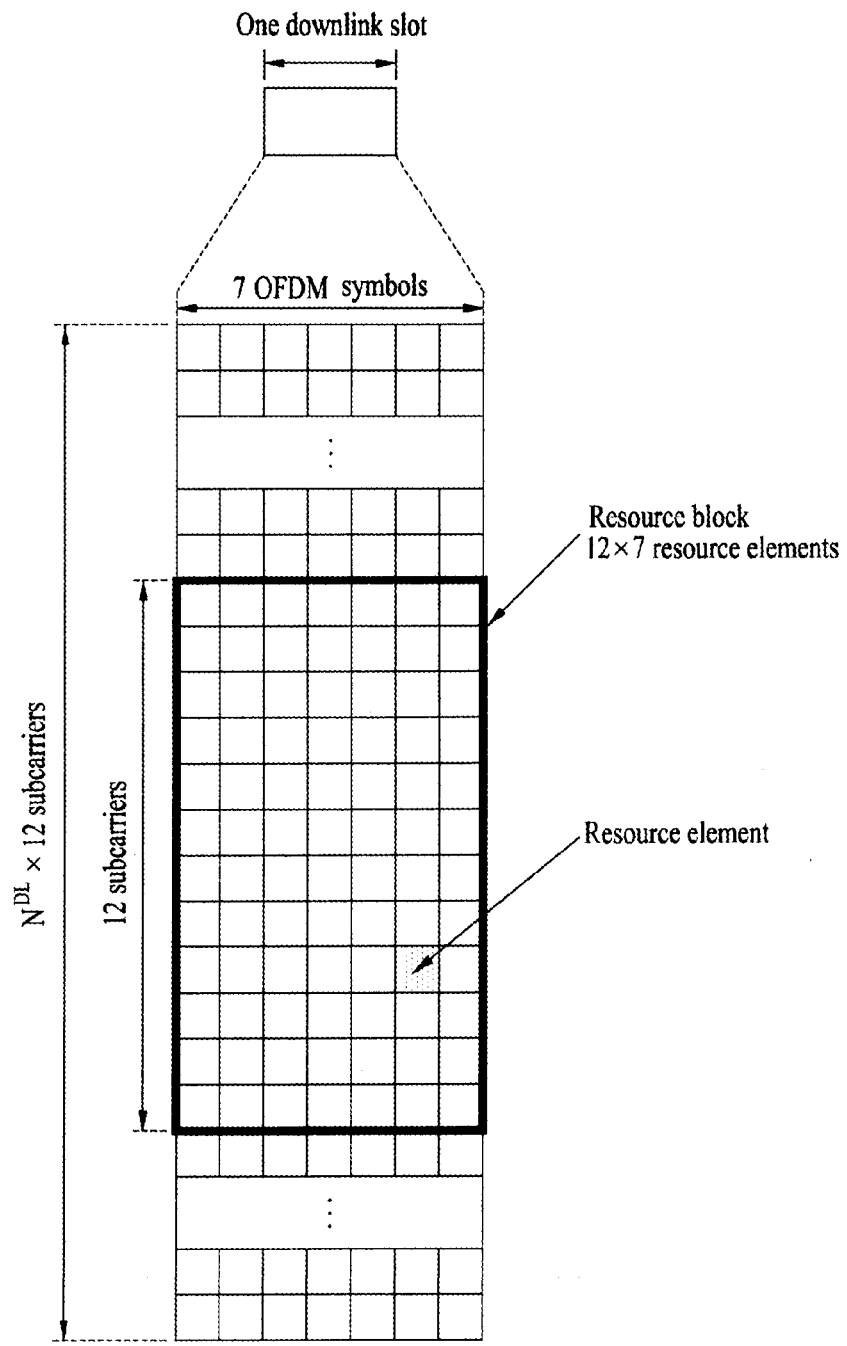
FIG. 2 illustrates a resource structure of one DL slot.
Figure 3:
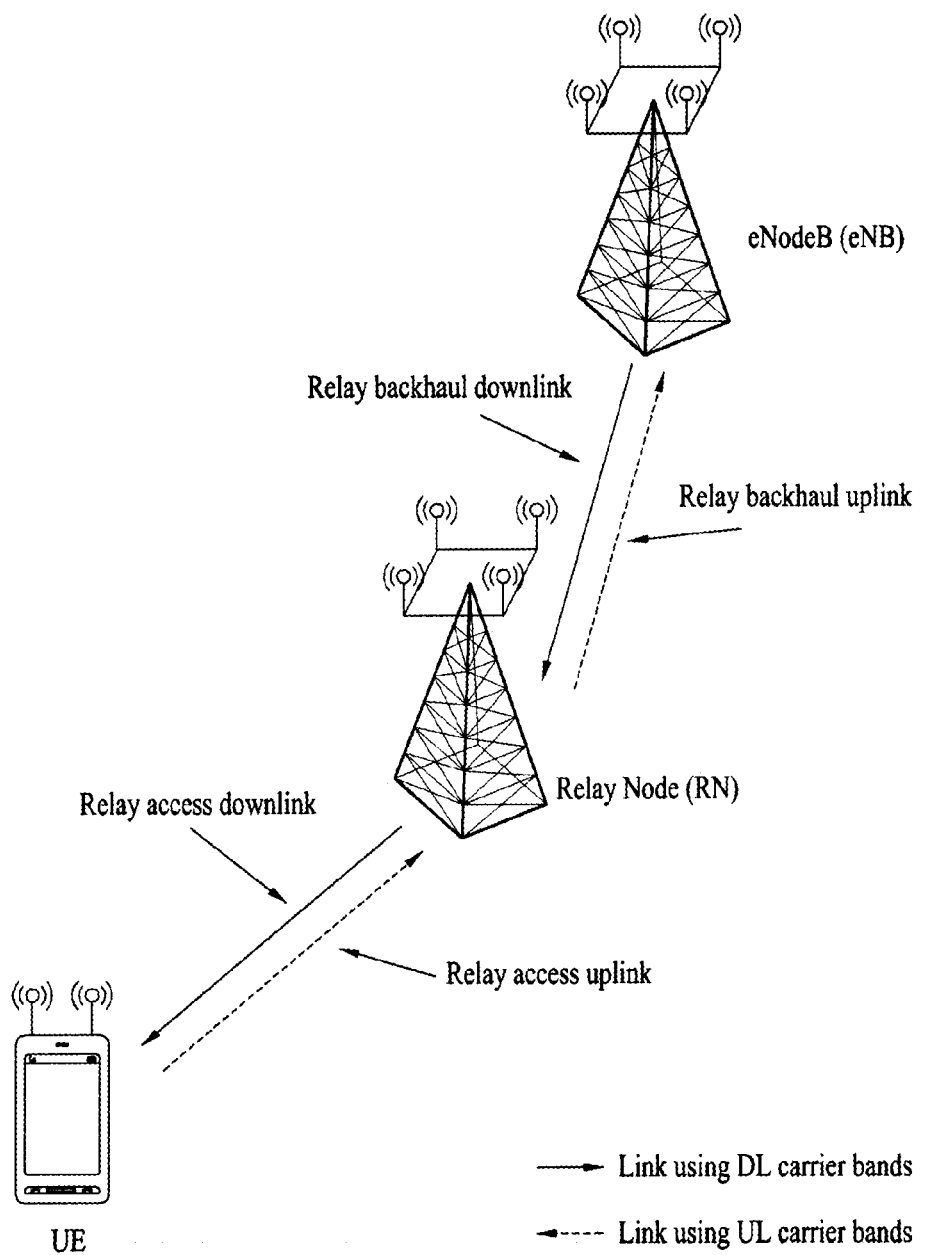
FIG. 3 is a diagram illustrating a wireless communication network using a relay node (RN)
Figure 6:
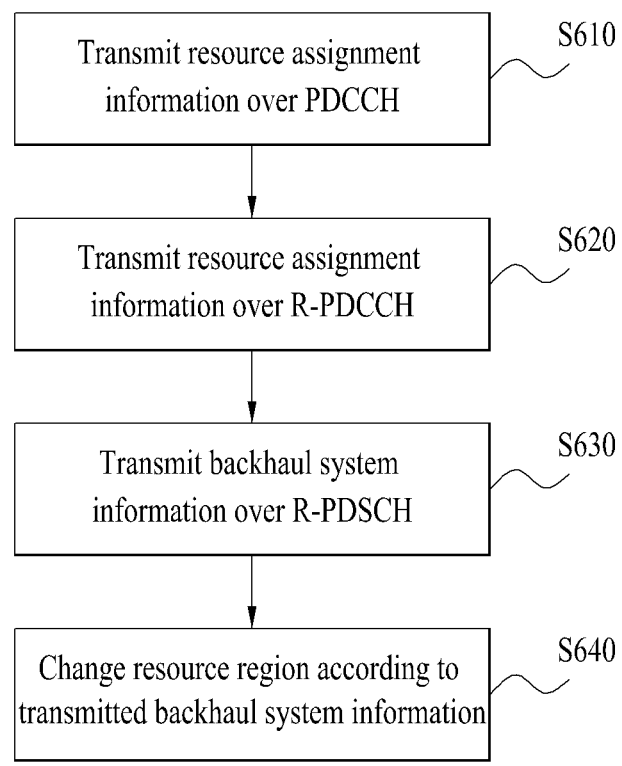
FIG. 6 is a flowchart illustrating a method for transmitting backhaul DL control information according to a second embodiment of the present invention.

A method for transmitting backhaul DL control information according to a second embodiment of the present invention will hereinafter be described with reference to FIG. 2. FIG. 6 is a method for transmitting backhaul DL control information according to a second embodiment of the present invention. In accordance with the control information transmission method of the second embodiment, separate downlink channel assignment PDCCH and R-PDCCH for receiving UEs and RNs that serve as diversified DL reception entities are transmitted independently.

As can be seen from FIG. 6, the eNB may transmit resource assignment information of a R-PDSCH used for transmitting backhaul system information to one or more UEs over a PDCCH in step S610, and may transmit resource assignment information of the R-PDSCH to one or more RNs over a R-PDCCH in step S620.

The eNB transmits backhaul system information to one or more RNs or one or more UEs through RRC signaling over a R-PDSCH configured according to the resource assignment information in step S630. In this case, the eNB may transmit cell-specific RRC signaling including backhaul system information through one R-PDSCH of the resource region for R-PDSCH transmission. If the frequency resource region for R-PDSCH transmission is established, backhaul system information may be transmitted through a series of physical resource regions contained in the frequency resource region for R-PDSCH transmission.

A start point of a transmission OFDM symbol of a R-PDSCH transmitting the relay backhaul system information may be different from that of an OFDM symbol located after a control information transmission symbol of a control format indicator (CFI) over a PCFICH contained in a DL subframe from the viewpoint of an LTE-A UE. In other words, when receiving the system information over a PDCCH, LTE-A UEs may receive, demodulate, and decode signals from a transmission start symbol contained in a subframe of a R-PDSCH.

In addition, the resource region is changed according to the transmitted backhaul system information in step S640. If P is an integer of 1 or higher, the eNB may configure a resource region in response to backhaul system information transmitted from a time point corresponding to P subframes elapsed from a subframe at which backhaul system information is transmitted through RRC signaling. As a result, the eNB may receive a subframe according to the changed resource region configuration in the range from a backhaul DL subframe located just after the subframe having received the backhaul system information, or may receive a subframe depending upon the changed resource region configuration after the lapse of M subframes (where M≥1) located after the subframe having received backhaul system information.

Figure 7:
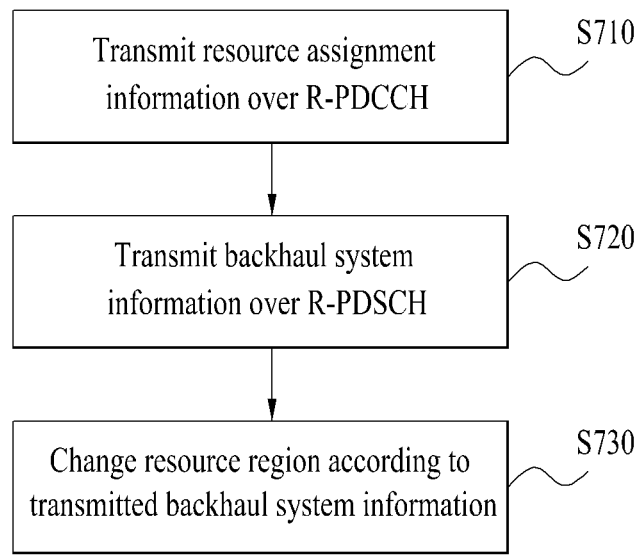
FIG. 7 is a flowchart illustrating a method for transmitting backhaul DL control information according to a third embodiment of the present invention.

A method for transmitting backhaul DL control information according to a third embodiment of the present invention will hereinafter be described with reference to FIG. 7. FIG. 7 is a flowchart illustrating a method for transmitting backhaul DL control information according to a third embodiment of the present invention. The third embodiment is characterized in that it does not generate a data channel transmitting overlapped backhaul system information and further transmits a control information physical channel for single channel assignment.

Referring to FIG. 7, the eNB may transmit resource assignment control information of a R-PDSCH transmitting backhaul system information to one or more UEs or RNs over a R-PDCCH (or one arbitrary PDCCH contained in a PDCCH region received by the LTE-A UE) in step S710.

The backhaul system information is transmitted to one or more RNs or one or more UEs through RRC signaling over a R-PDSCH determined by the resource assignment information in step S720.

The RN receives cell-specific relay-node-common resource assignment information over a R-PDCCH region, and receives a R-PDSCH according to resource assignment information. In this case, the corresponding R-PDCCH may be CRC-masked with an RNTI commonly assigned to a plurality of arbitrary reception entities.

In addition, the LTE-A UE performs blind decoding of a PDCCH region of a subframe, and is limited only to a given time or successively decodes a R-PDCCH transmission resource region contained in a subframe, such that it can obtain resource assignment information of a R-PDSCH transmitting backhaul system information. A R-PDCCH received by the LTE-A UE according to the above-mentioned purpose may be basically identical to a R-PDCCH received by each RN, it should be noted that the aforementioned R-PDCCH may be a separate R-PDCCH that uses a separate C-RNTI according to a specific purpose. In addition, the LTE-A UE obtains backhaul system information by decoding R-PDSCH according to resource assignment information. That is, the LTE-A UEs perform blind decoding of a PDCCH and R-PDCCH in two resource regions of an arbitrary DL subframe.

Alternatively, the eNB may transmit resource assignment information to one or more UEs or one or more RNs over a PDCCH, and may transmit backhaul system information to the one or more RNs or the one or more UEs through RRC signaling over a PDSCH determined according to the resource assignment information.

The third embodiment of the present invention is characterized in that it does not require additional transmission resources.

Next, a method for transmitting backhaul DL control information according to a fourth embodiment of the present invention will hereinafter be described in detail.

In accordance with the fourth embodiment, the eNB may dynamically or semi-dynamically indicate all or some parts of backhaul system information through cell-specific L1/L2 control signaling. The eNB may transmit all or some parts of the backhaul system information over a PDCCH or R-PDCCH through L1/L2 control signaling in which a dedicated DCI format is defined, or may multiplex all or some parts of the backhaul system information with other channel assignment control information in the form of joint coding, include the multiplexed result in payload, and transmit the resultant payload.

In one embodiment, the eNB may transmit physical resources for a dedicated PDCCH that transmits backhaul system information to a R-PDCCH region or may assign physical resources for a R-PDCCH for legacy channel setup to the R-PDCCH region, such that the eNB performs CRC masking of the dedicated PDCCH or R-PDCCH using a cell-common RNTI and transmits the CRC-masked result to an RN, or RN and LTE-A UE. Alternatively, the eNB may assign physical resources for transmitting a PDCCH including backhaul system information and other channel assignment control information to the R-PDCCH region, perform CRC-masking of a R-PDCCH using the predefined UE-specific or cell-specific C-RNTI, and transmit the CRC-masked result to an RN, RN and LTE-A UE.

The LTE-A UE performs blind decoding of a PDCCH region of a subframe, and is limited only to a given time or successively decodes a R-PDCCH transmission resource region contained in a subframe, such that it can obtain backhaul system information.

For example, provided that an FDM is applied to multiplex R-PDCCH transmission, a series of PRBs may be used to transmit backhaul system information. In this case, a transmission channel is configured in the form of a PDCCH and may be defined as payload on a DCI format.

Next, a method for transmitting backhaul DL control information according to a fifth embodiment of the present invention will hereinafter be described in detail.

The fifth embodiment of the present invention provides a method for transmitting backhaul system information using the case in which physical resources for each RN are configured for R-PDCCH transmission of the corresponding RN, instead of using the case in which a common physical resource region for a plurality of RNs is present in a backhaul DL subframe and a R-PDCCH for each RN is multiplexed in the physical resource region.

A first method may establish time-frequency physical resources via which a series of cell-specific R-PDCCHs to be commonly decoded by all RNs, and RN and LTE-A UE are transmitted, transmit a R-PDCCH including resource assignment information through the physical resource region, and transmit backhaul system information over a R-PDSCH determined according to the resource assignment information.

In this case, R-PDCCH may be CRC-masked by a common RNTI of RNs or may be CRC-masked by a common RNTI of the RN and LTE-A UE.

A second method is designed to transmit backhaul system information through UE-specific or RN-specific RRC signaling. That is, the second method is a method for transmitting backhaul system information over a R-PDCCH and R-PDSCH specified for each RN.

Although the second method has a disadvantage in that it requires a large amount of resources to transmit backhaul system information, the second method has an advantage in that it need not establish physical resources of time-frequency domains for cell-specific RN-common R-PDCCH. The second method relates to a method for configuring backhaul DL and UL subframes and a frequency resource region. Especially, the second method is suitable for the design and configuration for minimizing the number of cell-specific RN-common system control information requests. In order to solve the above-mentioned disadvantages, RN-specific system information is combined with cell-specific system information, such that the combined result can be transmitted to R-PDSCH.

Next, an exemplary case in which first to fifth embodiments are extended to a method for transmitting information regarding cell-specific, cell-specific RN-common or RN-common RRC control information or parameters will hereinafter be described in detail.

In this case, applicable control information may include TPC command information, random access response-associated control information, and backhaul DL control information regarding paging information of an access link.

In case of the TPC command information, different grouping methods may be applied to an RN and a UE, this control information may be used as signaling information that is capable of being directly transmitted over a PDCCH without using a separate PDSCH, and a transmission resource region to be decoded by all RNs for use in the arbitrary transmission and multiplexing scheme of a R-PDCCH are separately established to be distinguished from each other, such that a method for transmitting TPC command information of a plurality of RNs over a specific R-PDCCH may be used. In addition, for a method capable of being used concurrently with the above-mentioned method or a method different from the above-mentioned method, a common TPC-RNTI between RNs may be established, or the established result may be CRC-masked with a CRC of the R-PDCCH.

Provided that the RN has a random access function, when configuring a random access response in response to an eNB detection signal answering preamble transmission of a random access channel (RACH) between RNs, if PRACH preambles for individual RNs may be assigned separately from each other, or if the RN uses a cell-specific PRACH preamble to be shared with UEs, the eNB may distinctively configure a separate random access response message for such RNs. However, provided that the PRACH preamble is not distinctively assigned to RNs and UEs, there is no need for the eNB to distinctively configure random access responses of RNs and UEs.

In the former case, in order to transmit a random access response configured to discriminate among RNs, RN-common PDCCH or R-PDCCH having been CRC-masked by an RA-RNTI is transmitted through a R-PDCCH transmission region or a transmission resource predetermined for transmission of the R-PDCCH, and RNs can obtain random access response information by decoding an objective R-PDSCH through a R-PDCCH.

In the latter case, the method proposed by the first embodiment may be used. In more detail, a PDCCH for UEs being CRC-masked by RA-RNTI and a R-PDCCH for RNs are transmitted in individual transmission resource regions, and the PDCCH and the R-PDCCH may be classified into a R-PDSCH and a PDSCH each having a random access response message. R-PDSCH may be decoded by RNs and LTE-A UEs, and PDSCH may be decoded by Release-9 UEs and LTE-A UEs.

The LTE-A UE may obtain a random access response message by decoding any one of a PDSCH channel and a R-PDSCH channel, and may obtain the random access response message by decoding both the PDSCH channel and the R-PDSCH channel. Even in the case of the backhaul system information proposed by the present embodiment, the LTE-A UE may decode the corresponding PDSCH or R-PDSCH in the same manner as in the random access response message.

Differently from the above-mentioned description, it should be noted that random access response information for the latter case may also be transmitted using any one of the second, third, fourth, and fifth embodiments. For example, in accordance with the second embodiment, R-PDCCH and PDCCH are transmitted, each LTE-A UE and each RN may obtain random access response control information through R-PDSCH on the basis of the R-PDCCH and PDCCH transmission result. In accordance with the third embodiment, both of the RN and the LTE-A UE can obtain random access response control information transmitted to a R-PDSCH through R-PDCCH decoding.

In addition, paging information may be used as cell-specific or cell-common transmission information for RNs contained in an arbitrary cell. If each RN contained in the arbitrary cell enters an LTE idle state (LTE IDLE) or a DRX state according to an available implementation situation of the power supply scheme (for example, power supply for using battery power as a mobile relay node), each RN may have to directly receive a paging indication channel (such as PDCCH) and a paging channel (such as PDSCH) from a cell. Prior to the above-mentioned situation, common paging transmission information is configured for LTE IDLE or DRX reception entities from among reception entities contained in the tracking area composed of a plurality of cells, such that the configured result can be used as a common information channel in the paging region. Considering the above-mentioned situation, not only paging information of RNs of an arbitrary cell but also paging information of UEs present in an area of RNs may be configured, such that paging information to be transmitted to an access downlink of an arbitrary RN needs to be transmitted from a cell to several RNs. In this case, in the same manner as in the random access response information, the UE and RN may obtain a paging channel and a paging indication channel (PHICH) using the DL control information transmission methods proposed by the first to fifth embodiments of the present invention.

In one embodiment, considering that the corresponding information is very large in size and serves as common information for all or some RNs, methods for transmitting paging information to one arbitrary R-PDSCH and allowing all or some RNs to commonly decode the paging information may be efficiently used as a method for transmitting a series of RN common control information. For this purpose, a RN common RNTI may be used. In case of RN common R-PDCCH transmission and R-PDCCH transmission, it is not desirable that link adaptation or a transmission mode (including application of a series of precoders) are defined for a backhaul DL channel of an arbitrary RN, such that a series of open-loop transmission schemes (for example, transmit diversity scheme or open-loop precoding) may be used as an effective transmission method.

For example, although a series of precoding methods based on either a precoded demodulation reference signal (DM-RS) or the legacy LTE Release-8 CRS can be applied to either DL channel assignment of an arbitrary RN or UL grant R-PDCCH and R-PDSCH, a channel-independent open-loop transmission method (for example, transmit diversity scheme or open-loop precoding), a series of Release-8 PDCCH or PDSCH transmission schemes for frequency diversity allocation, or a distributed transmission scheme newly defined in a backhaul downlink may be applied to RN-common PUCCH and PDSCH transmission. The above-mentioned schemes may also be applied to backhaul system information transmission.

A method for classifying RRC parameter will hereinafter be described in detail.

RRC parameters specific to individual RNs may be added to a series of UE-specific RRC parameter sets. The UE-specific RRC parameters may be considered to be SIB2 group information. Alternatively, RN-specific RRC parameters may also be defined in a separate group.

In this case, RRC parameters to be received by each RN may include UE-specific RRC parameter group information and RN-specific RRC parameter group information.

On the other hand, although the legacy LTE and LTE-A UEs have been designed to receive only UE-specific RRC parameters, the LTE-A UE may also be designed to receive UE-specific RRC parameters and RN-specific RRC parameter groups. In this case, an RRC parameter group specific to the LTE-A UE may be separately defined such that LTE-A UEs and RNs may be designed to receive such parameters along with the legacy UE-specific RRC parameter group information. The above-mentioned proposals can be applied not only to general RRC configuration parameters but also to control parameters (e.g., TPC command control information) of specific physical layer level, and can also be applied to classification of separate L2 or L3 control parameters (e.g., paging information).

Next, a method for obtaining a frequency diversity gain during R-PDCCH transmission will hereinafter be described in detail. If R-PDCCH transmission resources are set to a restricted frequency region from among the entire frequency band, R-PDCCH transmission resource region may be defined in a virtual resource block (VRB) or virtual RE (VRE) region to obtain a frequency diversity gain. When RBs or REs defined in the VRB or VRE region are mapped to physical frequency resources, physical REs of distributed frequency resources can be configured by such mapping. In this case, the LTE Release-8 scheme may be used, and a division factor for defining an aspect for dividing a DVRB into physical frequency resource groups spaced apart from each other may be set to 2 or higher. The division factor may indicate information as to how many VRB or VRE resource constituent elements are mapped to one RB component subcarrier resource. Although such division may also be applied to a method for defining R-PDCCH transmission resources as a VRB, it should be noted that the division can also define a CCE or REG (Resource Element Group) for use in the legacy Release-8 PDCCH and the above-mentioned physical resource mapping scheme can also be used. If the division factor is set to 2 or higher, as many R-PDCCH transmission symbols as the number of division factors are mapped to physical resources in an arbitrary PRB.

A method for providing frequency diversity during R-PDCCH transmission may be selectively applied to either selection of detailed R-PDCCH transmission and multiplexing scheme or channel condition. That is, R-PDCCH transmission symbols are mapped to VRBs or VREs. For example, the localized VRB and PRB mapping is applied such that transmission symbols may be mapped to contiguous PRBs or PREs. In addition, the distributed VRB and PRB mapping is applied such that transmission symbols may be mapped to non-contiguous PRBs or PREs. If the number of division factors is set to 2 or higher, as many R-PDCCH transmission symbols as the number of division factors in an arbitrary PRB are mapped to physical resources. Such contiguous physical resource mapping and non-contiguous physical resource mapping may be selectively used through setting of RRC parameters that are transmitted to each RN through a series of RN-common or RN-specific RRC signaling.

Such R-PDCCH transmission method can be applied to all kinds of R-PDCCH transmission resource multiplexing methods.

Differently from the above-mentioned scheme, transmission resources may be established and applied in such a manner that the transmission resources are divided on a PRB basis in a R-PDCCH transmission resource region according to a specific PRB resource allocation method, such that a method for deriving a frequency diversity gain can be used. This method does not involve partial physical REs contained in a PRB, such that R-PDCCH frequency transmission resource configuration can be simplified. However, in order to obtain a frequency diversity gain by applying the above-mentioned scheme to arbitrary R-PDCCH transmission, transmission using two or more PRBs should be premised.

A method for multiplexing a R-PDCCH for RN-specific control information, a method for multiplexing a R-PDCCH for cell-specific control information or cell-specific RN-common control information, and a transmission resource region will hereinafter be described in detail.

From among four R-PFCCH multiplexing methods proposed by the present embodiments, the R-PDCCH multiplexing method for RN-specific RRC signaling or L1/L2 control signaling and the R-PDCCH multiplexing scheme for cell-specific or cell-specific RN-common RRC signaling, or L1/L2 control signaling may be configured in different ways, and the transmission resource region of the R-PDCCH can also be defined in different ways according to control information types.

For example, on the condition that several RNs perform common decoding during transmission of a R-PDCCH for cell-specific or cell-specific RN-common RRC signaling or L1/L2 control signaling, in order to prevent the occurrence of an inefficient operation such as scheduling of R-PDCCH transmission resources, the R-PDCCH multiplexing method of the second or third method may be used. R-PDCCH for RN-specific RRC signaling or R-PDCCH for L1/L2 control signaling may be applied to the first and fourth R-PDCCH multiplexing method considering that an arbitrary RN decodes a distinctive R-PDCCH transmitted to the arbitrary RN.

Alternatively, when transmitting R-PDCCH for cell-specific or cell-specific RN-common RRC signaling or R-PDCCH L1/L2 control signaling, methods proposed by the present invention can apply the distributed transmission resource configuration method can be applied to frequency resource configuration, and R-PDCCH for RN-specific RRC signaling or R-PDCCH for L1/L2 control signaling may be applied to the localized transmission resource configuration method.

In parallel to or separately from the above-mentioned schemes, when transmitting R-PDCCH for cell-specific or cell-specific RN-common RRC signaling or R-PDCCH for L1/L2 control signaling, a series of precoded DM-RSs or non-precoded DM-RSs may be used, a series of channel-independent open-loop transmission methods (for example, transmit diversity scheme or open-loop precoding) may be applied on the basis of a Release-9 CRS or a CRS that is newly defined either in the entire system band or in a R-PDCCH transmission resource region. In addition, a precoding method based on a DMRS that is precoded as a channel-dependent closed-loop precoder according to channel condition adaptation may be applied to the above-mentioned R-PDCCH transmission or a transmission diversity method based on non-precoded DMRS or CRS may also be used thereto.

In another example, on the condition that several RNs perform common decoding when transmitting R-PDCCH for cell-specific or cell-specific RN-common RRC signaling or R-PDCCH for L1/L2 control signaling, cell-specific RRC parameters, cell-specific RN-common RRC parameters, RN-common RRC parameters, and a TPC command for a series of RN groups may be considered to be system information acting as transmission control information. If each RN performs random access, only essential values are applied to options of transmission periods of individual information pieces of PDCCH control information related to a random access response, such that the number of such operations can be minimized and all the cases of period values requisite for each control information transmission are established in such a manner that a pattern of transmission time points for individual cases can be obtained.

The R-PDCCH transmission resource regions are established only in some subframes in which R-PDCCH for cell-specific or cell-specific RN-common RRC signaling or R-PDCCH for L1/L2 control signaling must be transmitted on the basis of the aforementioned pattern, and the position of a transmission resource region in time-frequency resources contained in a subframe may be established semi-persistently or persistently using RRC signaling or the like.

If R-PDCCH transmission resource regions of all RNs are integrated into one, the corresponding RN control information is jointly coded to make one R-PDCCH. Otherwise, the corresponding RN control information is separately coded so that it may be multiplexed into individual R-PDCCHs as necessary.

In addition, other transmission multiplexing methods may be applied to a transmission method between RN-specific DL channel assignment R-PDCCH and UL grant R-PDCCH.

For example, the FDM/TDM schemes may be applied to DL channel assignment R-PDCCH, and the FDM scheme may be applied to UL grant R-PDCCH. On the assumption of R-PDSCH transmission on the same backhaul DL subframe, reduction in decoding latency at a R-PDCCH RN is of importance to DL channel assignment R-PDCCH. In contrast, in case of UL grant R-PDCCH, the corresponding backhaul UL R-PUSCH transmission is carried out after the lapse of an arbitrary number of designated subframes (e.g., 4, 5, 6, or 3 subframes), and the influence of latency is relatively low and a backhaul DL R-PDSCH is not always premised for UL grant transmission. As a result, if R-PDSCH transmission is not present when using the FDM/TDM scheme, unused OFDM symbols may be generated in the corresponding backhaul DL subframe.

Next, under the condition that backhaul DL transmission resources and UL transmission resources for each RN are allocated using a series of semi-persistent scheduling (SPS) methods, a method for transmitting session activation- or session release-related signaling information will hereinafter be described in detail.

In the Release-8 LTE system, information requisite for session activation and session release is transmitted using a specific DCI format (for example, DCI format 1A) in downlink, or is transmitted using DCI format 0 in uplink. SPS activation is achieved through transmission resource assignment semi-persistently established through a PDCCH. In addition, SPS activation is achieved through control information such as a transmission MCS, a transmission antenna mode, etc. For session release, a PDCCH for SPS release is transmitted. Provided that the transmission subframe assignment scheme for transmitting data and/or control information using the SPS method and the transmission frequency resource assignment scheme are applied to an arbitrary RN, the following methods may be used for control signaling for the above-mentioned session activation and session release, and a detailed description thereof will be as follows.

Control signaling information for session activation and session release may be configured in the form of a DCI format of R-PDCCH using L1/L2 control signaling, and the resultant signaling information can be transmitted through the R-PDCCH transmission resource region. The above-mentioned scheme can be effectively applied to the case in which a series of common physical resource regions where each RN receives a R-PDCCH, and blind decoding is carried out through the common physical resource regions such that a RN-common physical resource region for overall R-PDCCH obtaining R-PDCCH control information belonging to the RN is configured.

In case of establishing the R-PDCCH transmission resource region, if OFDM transmission symbols and/or frequency transmission band resources are established to be classified according to individual RNs, control signaling for session activation or session release for an arbitrary RN is established through L1/L2 control signaling, such that the control signaling may be signaled through R-PDCCH. In addition, in order to reduce load encountered by semi-persistently or permanently establishing unnecessary control information transmission resources, SPS activation- and SPS release-related control information can be signaled to the corresponding RN through periodic or event-triggered RN-specific RRC signaling.

Figure 8:
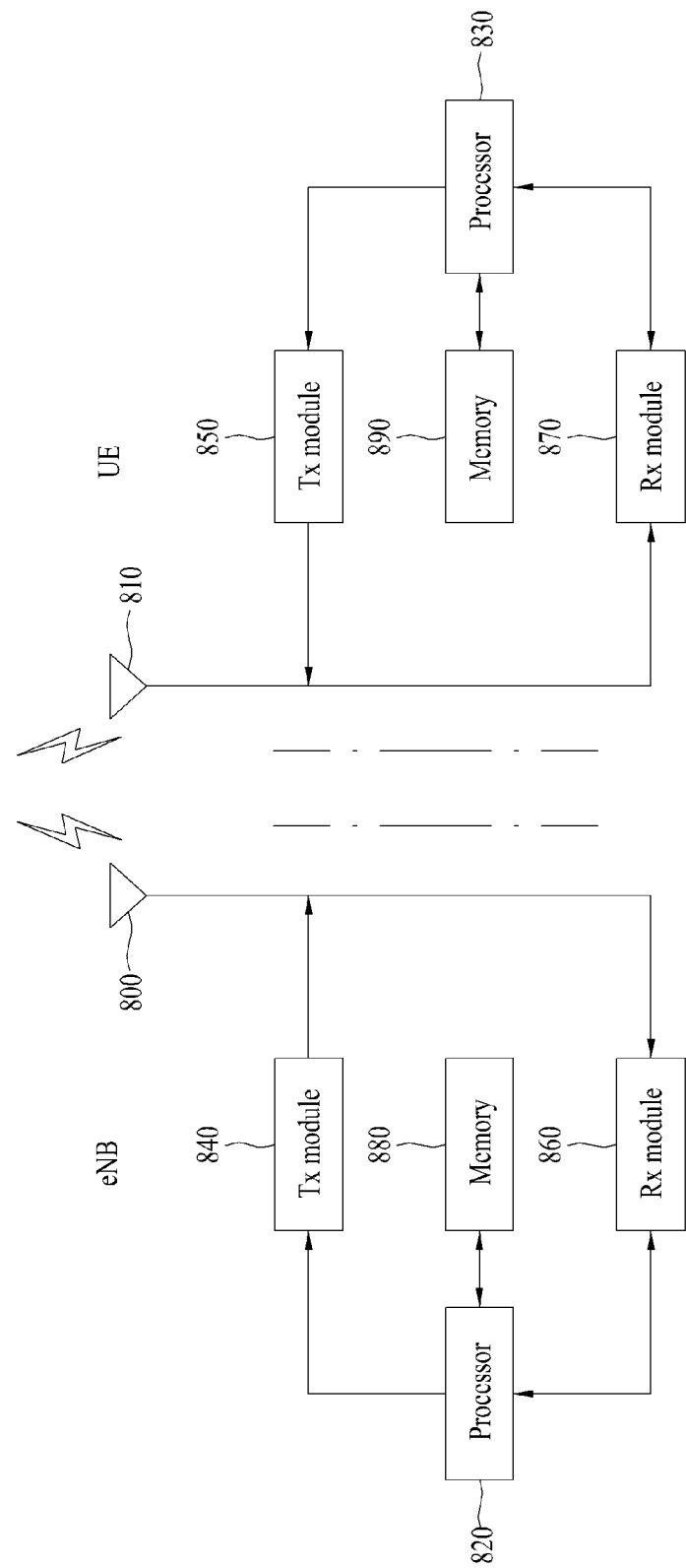
FIG. 8 is a block diagram illustrating a UE and an eNB applicable to embodiments of the present invention.

FIG. 8 is a block diagram illustrating detailed constituent components of a UE and an eNB that can be implemented in the above-mentioned embodiments.

Referring to FIG. 18, each of the UE and the eNB may include an antenna 800 or 810 for transmitting and receiving information, data, signals and/or messages, a Transmission (Tx) module 840 or 850 for transmitting messages by controlling the antenna 800 or 810, a Reception (Rx) module 860 or 870 for receiving messages by controlling the antenna 800 or 810, a memory 880 or 890 for storing information related to the eNB communication, and a processor 820 or 830 for controlling the memory 880 or 890. In this case, the eNB may be a femto BS (FBS) or a macro BS (MBS). The components of the UE are the counter parts of those of the eNB. The components of the transmitter and the receiver will be described below in more detail.

The antennas 800 and 810 include Tx antennas for transmitting signals generated from Tx modules 840 and 850 and Rx antennas for receiving radio frequency (RF) signals and providing the received RF signals to the Rx modules 860 and 870. If Multiple Input Multiple Output (MIMO) is supported, six or more antennas may be provided.

The processors 820 and 830 generally provide overall control to the UE and the eNB, respectively. Especially, the processors 820 and 830 may perform a control function for implementing the above-described exemplary embodiments of the present invention, a variable MAC frame control function based on service characteristics and a propagation environment, a handover function, an authentication and encryption function, etc. In addition, each of the processors 820 and 830 may include an encryption module for controlling encryption of various messages and a timer module for controlling transmission and reception of various messages.

The Tx modules 840 and 850 may encode and modulate transmission data scheduled by the processors 820 and 830 in a predetermined coding and modulation scheme and provide the modulated data to the antennas 800 and 810.

The Rx modules 860 and 870 may recover original data by demodulating and decoding data received through the antennas 800 and 810 and provide the recovered data to the processors 820 and 830.

The memories 880 and 890 may store programs for processing and control of the processors 820 and 830 and temporarily store input/output data (on the side of the UE, an uplink grant received from the eNB, system information, a station identifier (STID), a flow identifier (FID), an action time, an area assignment information, frame offset information and the like).

Each of the memories 880 and 890 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

The invention claimed is:

1. A method for transmitting backhaul downlink control information by a base station of a wireless communication system, the method comprising:
   transmitting resource assignment information to one or more user equipments (UEs) and one or more relay nodes (RNs) over a relay-physical downlink control channel (R-PDCCH);
   transmitting backhaul system information to the one or more RNs and the one or more UEs over a relay-physical downlink shared channel (R-PDSCH) determined according to the resource assignment information; and
   changing a backhaul downlink resource region according to the backhaul system information.

2. The method according to claim 1, wherein the backhaul system information is resource assignment information of the backhaul downlink.

3. The method according to claim 1, wherein the R-PDCCH is assigned to OFDM symbols located after a guard time for transmission/reception (Tx/Rx) mode switching of a backhaul downlink.

4. A method for receiving backhaul downlink control information by a relay node (RN) of a wireless communication system, the method comprising:
   receiving resource assignment information from a base station over a relay-physical downlink control channel (R-PDCCH);
   receiving backhaul system information from the base station over a relay-physical downlink shared channel (R-PDSCH) determined according to the resource assignment information; and
   receiving a backhaul downlink subframe according to the backhaul system information.

5. The method according to claim 4, wherein the R-PDCCH is assigned to OFDM symbols located after a guard time for transmission/reception (Tx/Rx) mode switching of a backhaul downlink.

6. A method for receiving backhaul downlink control information by a user equipment (UE) of a wireless communication system, the method comprising:
   receiving resource assignment information from a base station over a relay-physical downlink control channel (R-PDCCH);
   receiving backhaul system information from the base station over a relay-physical downlink shared channel (R-PDSCH) determined according to the resource assignment information; and
   receiving a downlink subframe according to the backhaul system information.

7. The method according to claim 6, wherein the R-PDCCH is assigned to OFDM symbols located after a guard time for transmission/reception (Tx/Rx) mode switching of a backhaul downlink.

8. A base station comprising:
   a transmission (Tx) module for transmitting resource assignment information to one or more user equipments (UEs) and one or more relay nodes (RNs) over a relay-physical downlink control channel (R-PDCCH), and transmitting backhaul system information to the one or more RNs and the one or more UEs over a relay-physical downlink shared channel (R-PDSCH) determined according to the resource assignment information; and
   a processor for changing a backhaul downlink resource region according to the backhaul system information.

9. The base station according to claim 8, wherein the R-PDCCH is assigned to OFDM symbols located after a guard time for transmission/reception (Tx/Rx) mode switching of a backhaul downlink.

10. A relay node (RN) comprising:
    a reception (Rx) module for receiving resource assignment information from a base station over a relay-physical downlink control channel (R-PDCCH), receiving backhaul system information from the base station over a relay-physical downlink shared channel (R-PDSCH) determined according to the resource assignment information, and receiving a backhaul downlink subframe according to the backhaul system information.

11. A user equipment (UE) comprising:
    a reception (Rx) module for receiving resource assignment information from a base station over a relay-physical downlink control channel (R-PDCCH), receiving backhaul system information from the base station over a relay-physical downlink shared channel (R-PDSCH) determined according to the resource assignment information, and receiving a downlink subframe according to the backhaul system information; and
    a processor for decoding the subframe.

12. A method for transmitting backhaul downlink control information by a base station of a wireless communication system, the method comprising:
    transmitting first resource assignment information to one or more user equipments (UEs) over a physical downlink control channel (PDCCH);

transmitting backhaul system information to the one or more UEs over a physical downlink shared channel (PDSCH) determined according to the first resource assignment information;

transmitting second resource assignment information to one or more relay nodes (RNs) over a relay-physical downlink control channel (R-PDCCH);

transmitting the backhaul system information to the one or more RNs over a relay-physical downlink shared channel (R-PDSCH) determined according to the second resource assignment information; and changing a backhaul downlink resource region according to the backhaul system information.

13. A method for transmitting backhaul downlink control information by a base station of a wireless communication system, the method comprising:

transmitting resource assignment information to one or more user equipments (UEs) over a physical downlink control channel (PDCCH);

transmitting the resource assignment information to one or more relay nodes (RNs) over a relay-physical downlink control channel (R-PDCCH);

transmitting backhaul system information to the one or more RNs and the one or more UEs over a relay-physical downlink shared channel (R-PDSCH) determined according to the resource assignment information; and changing a backhaul downlink resource region according to the backhaul system information.

14. A method for transmitting backhaul control information by a base station of a wireless communication system, the method comprising:

transmitting uplink resource assignment information to a relay node (RN) over an uplink grant relay-physical downlink control channel (R-PDCCH) multiplexed by a frequency division multiplexing (FDM) scheme; and receiving data from the relay node (RN) through uplink resources assigned according to the resource assignment information.

* * * * *